(12) United States Patent
Larsen et al.

(10) Patent No.: US 11,667,828 B2
(45) Date of Patent: Jun. 6, 2023

(54) MULTI-GRADE DIVERTING PARTICULATES

(71) Applicant: Halliburton Energy Services, Inc., Houston, TX (US)

(72) Inventors: Travis Hope Larsen, Houston, TX (US); Aaron Michael Beuterbaugh, Spring, TX (US); Larry Steven Eoff, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/846,994

(22) Filed: Jun. 22, 2022

(65) Prior Publication Data

US 2022/0315827 A1     Oct. 6, 2022

Related U.S. Application Data

(62) Division of application No. 17/074,227, filed as application No. PCT/US2018/044881 on Aug. 1, 2018, now Pat. No. 11,401,453.

(51) Int. Cl.
*C09K 8/508* (2006.01)

(52) U.S. Cl.
CPC .................. *C09K 8/5083* (2013.01)

(58) Field of Classification Search
None
See application file for complete search history.

(56) References Cited

U.S. PATENT DOCUMENTS

| | | | |
|---|---|---|---|
| 7,398,826 B2 | 7/2008 | Hoefer et al. | |
| 7,565,929 B2 | 7/2009 | Bustos et al. | |
| 7,775,278 B2 | 8/2010 | Willberg et al. | |
| 8,030,249 B2 | 10/2011 | Todd et al. | |
| 11,401,453 B2* | 8/2022 | Larsen | C09K 8/64 |
| 2012/0024526 A1 | 2/2012 | Liang et al. | |
| 2013/0233546 A1 | 9/2013 | Liang et al. | |

(Continued)

FOREIGN PATENT DOCUMENTS

| | | |
|---|---|---|
| WO | 2016089388 | 6/2016 |
| WO | 2017086905 | 5/2017 |

OTHER PUBLICATIONS

ISRWO International Search Report and Written Opinion for PCT/US2018/044881 dated Aug. 1, 2018.

(Continued)

*Primary Examiner* — Andrew Sue-Ako

(74) *Attorney, Agent, or Firm* — Thomas Rooney; C. Tumey Law Group PLLC

(57) ABSTRACT

A variety of methods, compositions, and systems are disclosed, including, a method comprising: introducing a treatment fluid into a wellbore penetrating a subterranean formation wherein the treatment fluid comprises: a base fluid; and multi-grade diverting particulates, wherein the multi-grade diverting particulates comprise a degradable polymer, wherein the degradable polymer comprises a first portion of the degradable polymer and a second portion of the degradable polymer of different grades, wherein the multi-grade diverting particulate at least partially plugs a zone in the subterranean formation; and diverting at least a portion of the treatment fluid and/or a subsequently introduced fluid away from the zone.

20 Claims, 4 Drawing Sheets

(56) References Cited

U.S. PATENT DOCUMENTS

| | | | |
|---|---|---|---|
| 2013/0292123 A1 | 11/2013 | Murphree et al. | |
| 2014/0116701 A1 | 5/2014 | Tang | |
| 2015/0300140 A1 | 10/2015 | Eoff et al. | |
| 2017/0166798 A1 | 6/2017 | Okamoto et al. | |
| 2017/0210965 A1 | 7/2017 | Cortez et al. | |
| 2017/0210976 A1 | 7/2017 | Okamoto et al. | |
| 2017/0369708 A1* | 12/2017 | Kokel | C08K 7/02 |
| 2018/0258344 A1 | 9/2018 | Holtsclaw et al. | |
| 2018/0346787 A1 | 12/2018 | Belakshe et al. | |
| 2019/0233719 A1 | 8/2019 | Eoff et al. | |
| 2020/0002603 A1 | 1/2020 | Eoff et al. | |

OTHER PUBLICATIONS

Real Divert, Baker, available at https://www.bakerhughes.com/integrated-well-services/integrated-well-construction/drilling/drilling-rig-equipment-and-services/onshore-drilling-systems/diverters.

FracTech, NuFlow, 2016, available at https://www.nuflowtech.com/how-nu-flow-works/product-overview.

Broadband, Schlumberger, 2020, available at https://www.slb.com/completions/stimulation/fracturing-services/broadband-services#related-information.

Trivert, Trican, 2017, available at https://www.tricanwellservice.com/products/trivert-diverting-agent.

TBlockSure, Weatherford, 2015, available at https://www.weatherford.com/en/products-and-services/completions/multistage-fracturing/stimulation-services/fluid-systems.

AccessAcid Service, Halliburton, 2017, available at https://www.halliburton.com/en-US/ps/production-solutions/well-intervention/chemicals/formation-damage-stimulation/diverters/accessacid-stimulation-service.html.

BioVert, Halliburton, 2012, available at https://www.halliburton.com/en-US/ps/stimulation/stimulation/fracturing/accessfrac-stimulation-service.html.

Office Action Summary for U.S. Appl. No. 17/074,227 dated Dec. 8, 2021.

* cited by examiner

MULTI-GRADE DIVERTING PARTICULATES

The present application is a divisional of U.S. patent application Ser. No. 17/074,227, filed on Oct. 19, 2020, the entire disclosure of which is incorporated herein by reference. Patent application Ser. No. 17/074,227 is a 371 application of PCT/US2018/044881, filed on Aug. 1, 2018.

BACKGROUND

After a wellbore is drilled and completed in a zone of a subterranean formation, it may often be necessary to introduce a treatment fluid into the zone. As used herein "zone" simply refers to a portion of the formation and does not imply a particular geological strata or composition. For example, the producing zone may be stimulated by introducing a hydraulic fracturing fluid into the producing zone to create fractures in the formation, thereby increasing the production of hydrocarbons therefrom. In another example, a producing zone may require an acid treatment to enhance fractures already present in the formation. To insure that the producing zone is uniformly treated with the treatment fluid, a treatment fluid including a diverting particulate may be used to ensure the treatment fluid contacts the entire zone requiring treatment. A subterranean formation may have sections of varying permeability, reservoir pressures and/or varying degrees of formation damage, and thus may accept varying amounts of certain treatment fluids. For example, low reservoir pressure in certain areas of a subterranean formation or a rock matrix or a proppant pack of high permeability may permit that portion to accept larger amounts of certain treatment fluids. It may be difficult to obtain a uniform distribution of the treatment fluid throughout the entire treatment interval. For instance, the treatment fluid may preferentially enter portions of the interval with low fluid flow resistance at the expense of portions of the treatment interval with higher fluid flow resistance. In some instances, these intervals with variable flow resistance may be water-producing intervals.

In some methods of treating such subterranean formations, once the less fluid flow-resistant portions of a subterranean formation have been treated, that area may be sealed off using a variety of techniques to divert treatment fluids to more fluid flow-resistant portions of the interval. Such techniques may have involved, among other things, the injection of particulates, foams, emulsions, plugs, packers, or blocking polymers (e.g., crosslinked aqueous gels) into the interval so as to plug off high-permeability portions of the subterranean formation once they have been treated, thereby diverting subsequently injected fluids to more fluid flow-resistant portions of the subterranean formation.

In some techniques, a degradable polymer may be introduced into the wellbore and subsequently into the subterranean formation to bridge fractures and perforations to provide the diversion. Oftentimes, it is preferable to remove the degradable polymers after the treatment is completed to ensure maximum flow of formation fluids into the wellbore.

BRIEF DESCRIPTION OF THE DRAWINGS

These drawings illustrate certain aspects of some of the present disclosure and should not be used to limit or define the disclosure.

DETAILED DESCRIPTION

Figure 1:
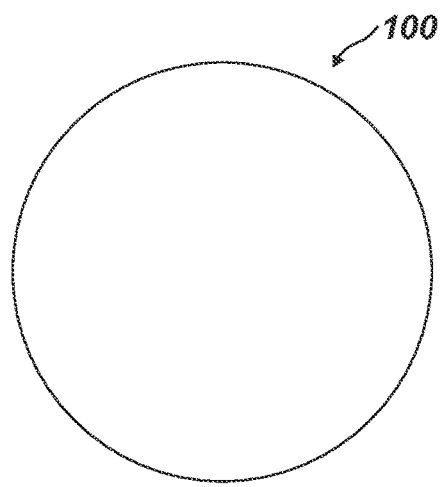
FIG. 1 is an illustration of an example multi-grade diverting particulate in the form of a homogeneous compound that includes a first portion of degradable polymer and a second portion of degradable polymer.

The present disclosure is directed to subterranean treatments, and, at least in part, to using a multi-grade diverting particulates for controlling flow of fluids in wellbore applications, such as in diversion applications. Although many degradable polymers have been previously used in diversion applications, there are several drawbacks such as high cost, low availability, and undesirable dissolution kinetics, among others. Herein, the use of multi-grade diverting particulates including degradable polymers is disclosed. The multi-grade diverting particulates may be used in fracturing, acidizing, and other wellbore operations to control the area of the formation where a treatment fluid is applied or acting on. An operator may choose to apply a multi-grade diverting particulate to a particular formation zone to block off the treatment fluid from acting in that zone. A multi-grade diverting particulate may be provided to plug perforations or bridge fractures in the formation thereby diverting the flow of a treatment fluid to another formation zone or flow path. Multi-grade diverting particulates may be delivered downhole by any suitable method. A non-limiting example may include, by way of treatment fluid. Multi-grade diverting particulates that include degradable polymers may have improved diversion, more rapid dissolution kinetics, especially at low temperatures, and reduced costs as compared to conventional diverting particulates. For example, the multi-grade diverting particulates may be suitable for use at low temperatures, for example, in subterranean formations (or particular zones thereof) with temperature of about 350° F. (177° C.) or less, for example, ranging from 350° F. (177° C.) to 75° F. (25° C.). In an embodiment, the multi-grade diverting particulates may be suitable for use at bottom hole temperatures of about 150° F. (65° C.) or less.

The treatment fluid may be any suitable treatment fluid for use in a variety of downhole applications. Suitable downhole applications may include, but are not limited to, drilling operations, lost circulation management operations, stimulation operations, sand control operations, perforating operations, completion operations, acidizing operations, scale inhibiting operations, water-blocking operations, clay stabilizer operations, fracturing operations, frac-packing operations, gravel packing operations, wellbore strengthening operations, sag control operations, displacing solids laden drilling fluid, the like, and/or any combinations thereof. The treatment fluid may have a density of about 5.5 lb/gal (0.6 kg/L) or greater. Suitable treatment fluids may have a density at a point in range of from about 7.5 lb/gal (0.9 kg/L) to about 18.5 lb/gal (2.2 kg/L).

The treatment fluid may include a base fluid and a multi-grade diverting particulate. Examples of suitable base fluids may be aqueous or non-aqueous. Suitable non-aqueous fluids may include one or more organic liquids, such as hydrocarbons (e.g., kerosene, xylene, toluene, or diesel), oils (e.g., mineral oils or synthetic oils), esters, and the like. Suitable aqueous base fluids may include, without limitation, water, freshwater, saltwater, brine, seawater, or any other suitable base fluids that preferably do not undesirably interact with the other components used in the treatment fluids. The base fluid may be present in the treatment fluids in an amount in the range of from about 1% to about 100% by volume of the treatment fluid. Optionally, the base fluid may be present in the treatment fluids in an amount in the range of from about 30% to about 100% by volume of the treatment fluid.

The treatment fluid may further include a multi-grade diverting particulate. The multi-grade diverting particulate may include at least one degradable polymer. Any suitable degradable polymer may be used including, but not limited to, a degradable polymer. In an embodiment, the multi-grade diverting particulate may include more than one degradable polymer. As used here, the term "multi-grade diverting particulate" refers to a diverting particulate that may include one or more degradable polymers of different grades in the same particulate. As used herein, the phrase "grade" refers to a degradable polymer that includes a specific degree of hydrolysis and a specific molecular weight. Each grade may differ in degree of hydrolysis and/or molecular weight. Accordingly, multi-grade diverting particulate may include two different grades of a degradable polymer varying in degree of hydrolysis, in molecular weight, or in both degree of hydrolysis and in molecular weight. In addition, the multi-grade diverting particulate may include two degradable polymers of different grade that vary in degree of hydrolysis, in molecular weight, or in both degree of hydrolysis and in molecular weight. To be considered a different grade, the degradable polymers may have the same degree of hydrolysis but may vary in molecular weight. Optionally, to be considered a different grade, the degradable polymers may vary in their degree of hydrolysis but may have the same molecular weight. Optionally, to be considered a different grade, the degradable polymers may vary in both degree of hydrolysis and molecular weight. To be considered a different grade, the degree of hydrolysis may vary by about at least 1% or greater. To be considered a different grade, the molecular weight may vary by about at least 5,000 or greater.

As used herein, the term "degree of hydrolysis" may be defined as the percentage of polymeric chain that contains poly-alcohol functional groups as derived from base hydrolysis of polyvinyl acetates. The degree of hydrolysis may be determined using any conventional method known in the art, including but not limited to, chemical analysis, nuclear magnetic resonance analysis, the like, and/or any combination thereof. As used herein, the term "molecular weight" refers to weight average molecular weight. The degree of hydrolysis and molecular weight may directly correlate to the strength of the bridge/seal the degradable polymer may form within the formation. The degree of hydrolysis may also directly correlate with the strength of the bridge formed with the degradable polymer and the maximum amount of pressure the bridge may withstand. The degree of hydrolysis and molecular weight may be inversely correlated to the solubility of the degradable polymer.

Multi-grade diverting particulates are typically solid in form. Multi-grade diverting particulates may be present in the treatment fluid in any amount for a particular application. Suitable amounts may include, but are not limited to, an amount of about 0.05% to about 75% by volume of the treatment fluid. In other examples, the multi-grade diverting particulates may be present in the treatment fluid in an amount of about 0.05% to about 10% by volume of the treatment fluid, about 10% to about 20% by volume of the treatment fluid, about 20% to about 30% by volume of the treatment fluid, about 30% to about 40% by volume of the treatment fluid, or about 40% to about 50% by volume of the treatment fluid, or about 50% to about 60% by volume of the treatment fluid, or about 60% to about 75% by volume of the treatment fluid. These ranges encompass every number in between, for example. For example, the multi-grade diverting particulates may be present in the treatment fluid in an amount ranging from about 0.5% to about 65% by volume of the treatment fluid. One of ordinary skill in the art with the benefit of this disclosure should be able to select an appropriate amount of the multi-grade diverting particulates to use for a particular application. Multi-grade diverting particulates may be in any suitable form.

Multi-grade diverting particulates may be any suitable size capable of functioning as a diverting particulate. Suitable sizes may include a $D_v50$ particle size in the range from about 0.01 microns to about 400 microns, or from about 400 microns to about 10 millimeters, or from about 400 microns to about 2.5 millimeters, or from about 1 millimeter to about 10 millimeters. The $D_v50$ particle size may also be referred to as the median particle size by volume of a particulate material. The $D_v50$ particle size is defined as the maximum particle diameter below which 50% of the material volume exists. The $D_v50$ particle size values for a particular sample may be measured by commercially available particle size analyzers such as those manufactured by Malvern Instruments, Worcestershire, United Kingdom. Optionally, the multi-grade diverting particulate may have a $D_v50$ particle size that ranges in size from about 1 millimeter to about 5 millimeters, or from about 3 millimeters to about 10 millimeters. Multi-grade diverting particulates may be any suitable shape. Suitable shapes may include, but are not limited to, any physical shape as well as an irregular geometry, including the physical shape of platelets, shavings, fibers, flakes, ribbons, rods, strips, spheroids, beads, toroids, oviods, spheres, cylinders, tablets, wafers, or any other physical shape. In an embodiment, the multi-grade diverting particulates may have an aspect ratio of about 1:1 to about 500:1, for example, ranging from about 5:1 to about 10:1, or about 1:1 to about 10:1, or about 5:1 to about 20:1, or about 1:1 to about 200:1, or about 1:1 to about 500:1, or about 200:1 to about 500:1. It should be noted that any suitable aspect ratio within the given range above may be used. With the present disclosure, one skilled in the art would be able to select an appropriate aspect ratio for a given application.

Multi-grade diverting particulates may include a degradable polymer. Any suitable degradable polymer may be used, including but not limited to, a degradable polymer. The degradable polymer may be at least partially degradable. The terms "polymer" or "polymers" as used herein do not imply any particular degree of polymerization; for instance, oligomers are encompassed within this definition. A polymer is considered to be "degradable" herein if it is capable of undergoing an irreversible degradation when used in subterranean applications, e.g., in a wellbore. The term "irreversible" as used herein means that the degradable polymer should degrade in situ (e.g., within a wellbore) but should not recrystallize or reconsolidate in situ after degradation (e.g., in a wellbore).

Degradable polymers may include, but are not to be limited to, dissolvable materials, materials that deform or melt upon heating such as thermoplastic materials, hydrolytically degradable polymers, materials degradable by exposure to radiation, materials reactive to acidic fluids, or any combination thereof. In some embodiments, degradable polymers may be degraded by temperature, presence of moisture, oxygen, microorganisms, enzymes, pH, free radicals, and the like. In some embodiments, degradation may be initiated in a subsequent treatment fluid introduced into the subterranean formation at some time when diverting is no longer necessary. In some embodiments, degradation may be initiated by a delayed-release acid, such as an acid-releasing degradable polymer or an encapsulated acid, and this may be included in the treatment fluid including the degradable polymer so as to reduce the pH of the treatment fluid at a desired time, for example, after introduction of the treatment fluid into the subterranean formation.

Degradable polymers may include a degradable polymer. Any suitable degradable polymer may be used. Suitable degradable polymers may include polysaccharides such as cellulose; chitin; chitosan; aliphatic polyesters; and proteins. Such suitable polymers may be prepared by polycondensation reactions, ring-opening polymerizations, free radical polymerizations, anionic polymerizations, carbocationic polymerizations, coordinative ring-opening polymerizations, as well as by any other suitable process. Examples of specific degradable polymers that may be used in conjunction with the example methods include, but are not limited to, aliphatic poly(esters); poly(lactides); poly(glycolides); poly($\varepsilon$-caprolactones); poly(hydroxyester ethers); poly(hydroxybutyrates); poly(anhydrides); polycarbonates; polyols; poly(orthoesters); poly(aminoacids); poly(ethyleneoxides); poly(phosphazenes); poly(etheresters), hydroxy propyl methylcellulose, pectin, polyethylene oxide, polyvinyl alcohol, plasticized polyvinyl alcohol, alginate, polycaprolactone, gelatinised starch-based materials, polyester amides, polyamides, copolymers, terpolymers, and the like; and/or blends of any of these degradable polymers, and derivatives of these degradable polymers. As referred to herein, the term "derivative" is defined herein to include any compound that is made from one of the listed compounds, for example, by replacing one molecule in the base compound with another molecule or group of molecules. A specific example may include a combination of an aliphatic poly(ester) (e.g., poly(lactide) and polyvinyl alcohol). Other degradable polymers that are subject to hydrolytic degradation also may be suitable. One's choice may depend on the particular application and the conditions involved. Other guidelines to consider include the degradation products that result, the time required for the requisite degree of degradation, and the desired result of the degradation (e.g., voids). The degradable polymer may be of any suitable size. Suitable sizes may range from about 10 microns to about 2,000 microns. It should be noted that any size and/or size range within the specified range may be used.

In an embodiment, the degradable polymer may include polyvinyl alcohol (PVA) or another suitable polyol. PVA may be a solid material that may be manufactured in many forms, such as, for example, fibers, sheets, granules, beads, powder, and the like. PVA may be a synthetic polymer that may be water soluble and generally unaffected by petroleum hydrocarbons. The polymer includes a carbon chain backbone with hydroxyl and acetate groups. PVA may be produced by the hydrolysis of polyvinyl acetate in methanol catalyzed by a base. PVA may exist in three different aggregation states, which may be controlled by solution conditions. In a solid state, PVA may be semi-crystalline. The degree of crystallinity varies from one mode of manufacture to another and with the degree of hydrolysis and grade of the PVA. In aqueous solution, PVA may lose crystallinity and swell to form an amorphous structure, which may be flexible and malleable, but not yet solubilized. Depending on solution conditions, PVA may solubilize completely and exist as polymer stands in solution.

Dissolution of PVA may be dependent on a number of factors, including, but not limited to, the degree of hydrolysis, molecular weight, crystallinity, particle size, exposure temperature, and the like of the PVA. The degree of hydrolysis may be defined as the mole percent of hydroxyl groups on the polymer chain in relation to the non-hydrolyzed acetate groups. For example, PVA with a degree of hydrolysis of 88 would have 88 mole percent hydroxyl groups and 12 mole percent acetate groups along the polymer backbone. The hydroxyl and/or acetate groups may be distributed randomly or in blocks. Other factors affecting PVA solubility may include polymer concentration and salt concentration; the amount of unsolubilized PVA, e.g., amorphous PVA, may increase with increased concentrations of salt or polymer. The crystallinity of the PVA may also be used to control the rate at which the PVA will dissolve at various temperatures.

In an embodiment, the degradable polymer may include a plasticized polyvinyl alcohol. The plasticized polyvinyl alcohol may be a degradable polyvinyl alcohol that further comprises a plasticizer. The plasticizer may plasticize the polyvinyl alcohol. The plasticized PVA may stabilize the PVA in the diverter material. In certain embodiments, the plasticizer may reduce the melting point of PVA below its degradation point, allowing for the PVA to be liquefied and processed through an extruder to form larger particles of PVA than 30 is possible without the plasticizer. In some embodiments, the plasticizer may be a surfactant. Plasticizers suitable for certain embodiments of the present disclosure may include, but are not limited to glycol, polyethylene glycol, polypropylene glycol, fatty acid esters, lactide monomers, glycolide monomers, citric acid esters, epoxidized oil, adipate ester, azaleate. Suitable amounts of plasticizers present in the multi-functional plasticized diverter material may include, but are not limited to, about 0.001% to about 10%, about 0.001% to about 5%, about 5% to about 10% by weight of multi-functional plasticized diverter material. It should be noted that these ranges encompass every number in between.

The degradable polymer may be present in the multi-grade diverting particulate in any suitable amount, including, but not limited to, an amount in the range of from about 60% to about 100% by weight of the multi-grade diverting particulate. Degradable polymer may be present in the range from about 60% to about 90%, or about 90% to about 100%, or about 85% to about 95% by weight of multi-grade diverting particulate. Suitable amounts of degradable polymer present in the multi-grade diverting particulate may include, but are not limited to, about 60%, about 70%, about 80%, about 85%, about 90%, about 95%, about 98%, about 99%, or about 100% by weight of multi-grade diverting particulate. It should be noted that these ranges encompass every number in between. Each degradable polymer in the multi-grade diverting particulate may be present in any suitable amount. One of ordinary skill in the art, with the benefit of the present disclosure, should be able choose the appropriate number of degradable polymers for a given application.

As previously described, the multi-grade diverting particulates may include a first portion of degradable polymer and a second portion of degradable polymer, wherein the first portion of degradable polymer and the second portion of degradable polymer are different grades. The first portion of degradable polymer and the second portion of degradable polymer may be the same degradable polymer. Any suitable degradable polymer may be used, including but not limited to, a degradable polymer. Optionally, more than one grade of degradable polymer may be used, wherein each grade of degradable polymer may include one distinct region. The first portion of degradable polymer and the second portion of degradable polymer may be different grades in that they vary by degree of hydrolysis and/or molecular weight. The first portion of degradable polymer may include any suitable degree of hydrolysis including, but not limited to, about 84 to about 99.5, or about 87 to about 89, or about 89 to about 99.5. The first portion of degradable polymer may include any suitable molecular weight, including but not limited to, about 10,000 to about 200,000, or about 10,000 to about 100,000, or about 100,000 to about 200,000. The second portion of degradable polymer may include any suitable degree of hydrolysis including, but not limited to, about 84 to about 99.5, or about 87 to about 89, or about 89 to about 99.5. The second portion of degradable polymer may include any suitable molecular weight, including but not limited to, about 10,000 to about 200,000, or about 10,000 to about 100,000, or about 100,000 to about 200,000.

The first portion of degradable polymer (e.g., PVA) may be present in the multi-grade diverting particulate in any suitable amount. Suitable amounts of the first portion of degradable polymer may include, but are not limited to, about 1 to about 99, or about 10 to about 90, or about 30 to about 70 by weight of the multi-grade diverting particulate. The second portion of degradable polymer (e.g., PVA) may be present in the multi-grade diverting particulate in any suitable amount. Suitable amounts may include, but are not limited to, about 1 to about 99, or about 10 to about 90, or about 30 to about 70 by weight of the multi-grade diverting particulate.

Any suitable technique may be used for preparation of the multi-grade diverting particulates. Suitable techniques may include, but are not limited to, spray coating, fluidized bed, tumbling, compression coating, dip coating, vacuum film coating, co-extrusion, the like, and/or any combination thereof. In an embodiment, the first portion of degradable polymer and the second portion of degradable polymer may occupy distinct regions of the multi-grade diverting particulates. The first and second portion of degradable polymer in each region may be the same degradable polymer so long as the first and second portion of degradable polymer vary by degree of hydrolysis and/or molecular weight. In an embodiment, the multi-grade diverting particulate may include a homogenous compound that includes the first and second portion of a degradable polymer of different grades. The homogenous compound may be prepared by uniformly mixing the first and second portion of degradable polymer. In an embodiment, the multi-grade diverting particulate may include a continuous phase and an internal phase. The continuous phase may include a first portion of degradable polymer and the internal phase may include a second portion of degradable polymer. The internal phase of the second portion of degradable polymer may be dispersed in the continuous phase of the first portion of degradable polymer.

Figure 2:
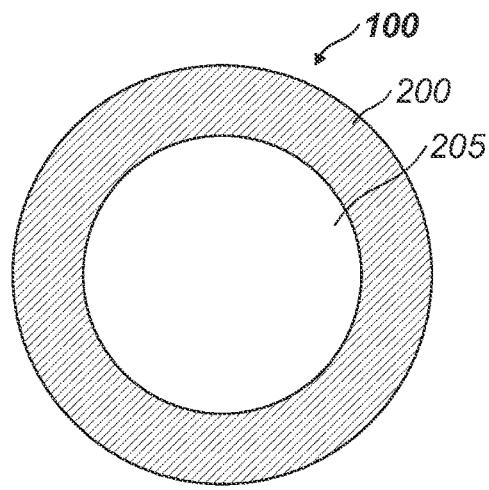
FIG. 2 is an illustration of another example multi-grade diverting particulate that includes a first portion of degradable polymer and a second portion of degradable polymer.
Figure 3:
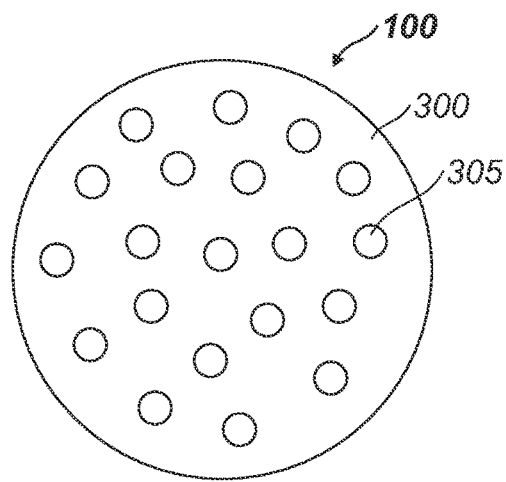
FIG. 3 is an illustration of another example multi-grade diverting particulate that includes an internal phase and an external phase that includes a first portion of degradable polymer and a second portion of degradable polymer.

FIGS. 1, 2, and 3 illustrate examples of a multi-grade diverting particulate 100. FIG. 1 illustrates the multi-grade diverting particulate 100 in the form of a homogenous compound. As previously described, the multi-grade diverting particulate 100 in the form of a homogenous compound may include a first portion of degradable polymer and a second portion of degradable polymer. As previously described, the first portion of degradable polymer and the second portion of degradable polymer may be the same degradable polymer so long as they are different grades. FIG. 2 another example of a multi-grade diverting particulate 100. The multi-grade diverting particulate 100 shown on FIG. 2 includes a first region 200 and a second region 205. The first region 200 may include a first portion of degradable polymer and the second region 205 may include a second portion of degradable polymer. As previously described, the first portion of degradable polymer and the second portion of degradable polymer may be the same degradable polymer so long as they are different grades. As illustrated on FIG. 2, the first region 200 may be coated on the second region 205 such that the second portion of degradable polymer may be disposed within the first region 200 of the first portion of degradable polymer. It may be advantageous to vary the molecular weight and degree of hydrolysis of the first region 200 and the second region 205 to have the multi-grade diverting particulate 100 with a desirable solubility and strength. For example, it may be desired for the second region 205 on the interior to be more readily soluble (e.g., second portion of degradable polymer with lower molecular weight and lower degree of hydrolysis) while the first region 200 may dissolve more slowly (e.g., first portion of degradable polymer higher molecular weight and higher degree of hydrolysis). This could provide a multi-grade diverting particulate that is more robust (e.g., maintaining strong seal) in treatment but dissolves more rapidly and more completely after treatment. FIG. 3 illustrates another example of a multi-grade diverting particulate 100. The multi-grade diverting particulate 100 shown on FIG. 3 may include a continuous phase 300 and an internal phase 305. The continuous phase 300 may comprise the first portion of degradable polymer or the second portion of degradable polymer. Internal phase 305 may comprise the first portion of degradable polymer or the second portion of degradable polymer, so long as the portion of degradable polymer in internal phase 305 is different from the portion of degradable polymer in the continuous phase 300. The first portion of degradable polymer and second portion of degradable polymer may be the same degradable polymer, so long as the first portion of the degradable polymer and the second portion of the degradable polymer vary in degree of hydrolysis and/or molecular weight. This may be advantageous, as it may aid in the placement and strength of a seal in a desired location downhole. It should be noted, that any number of distinct regions may be present and the present disclosure should not be limited to the two distinct regions disclosed above. With the present disclosure, one of ordinary skill in the art would be able to determine the appropriate number of distinct regions for a given application.

As previously discussed, it may be preferable that a multi-grade diverting particulate introduced into the wellbore be at least partially dissolvable, degradable, or removable to ensure production of formation fluids may be minimally affected by the multi-grade diverting particulate. When the multi-grade degradable polymer is soluble in water, the multi-grade degradable polymer may be readily removed from the formation by waiting until the multi-grade degradable polymer is dissolved. Where the multi-grade degradable polymer is slightly soluble or may become soluble under certain conditions, a chemical agent that increases the solubility of the multi-grade degradable polymer may be included. Any chemical agent capable of increasing the dissolution rate of the multi-grade degradable polymer may be included. In a non-limiting example, the chemical agent may be, an inert dissolvable material, a dissolution accelerator, the like, or any combination thereof. In examples where the multi-grade degradable polymer is insoluble in water, the multi-grade degradable polymer may still allow production of formation fluids and provide additional beneficial properties to the near wellbore region such as propping of fractures.

Multi-grade diverting particulate may further include an inert dissolvable material. Inert dissolve materials may be included as a filler material for decreasing overall cost of the multi-grade diverting particulate, or increase the bridging performance, of the diverting particulate, while also potentially increasing the overall dissolution rate of the multi-grade diverting particulate. Suitable inert dissolvable materials may include, but are not limited to, salts, inorganic compounds (e.g., calcium carbonate, sand, etc.), soluble organic compounds (e.g., waxes), the like, and/or any combination thereof. Inert dissolvable materials may be present in any suitable amount. Suitable amounts may include, but are not limited to, 1% to about 50% by weight of the multi-grade diverting particulate, or about 1% to about 25% by weight of the multi-grade diverting particulate, or about 25% to about 50% by weight of the multi-grade diverting particulate.

Multi-grade diverting particulate may further include a dissolution accelerator. Any suitable dissolution accelerator capable of increasing the overall dissolution rate of the multi-grade diverting particulate downhole may be used. Suitable dissolution accelerators may include, but are not limited to, inorganic acids, solid organic acids, simple saccharides, metal salts, the like, and/or any combination thereof. Suitable solid inorganic acids may include sulfamic acid. Suitable solid organic acids may include citric acid, ethylenediaminetetra-acetic acid (EDTA), N-Phosphonomethyl iminodiacetic acid (PMIDA), anhydrides, ortho esters, phosphonate esters, the like, and/or any combination thereof. Suitable simple saccharides, such as monosaccharides and disaccharides, may include glucose, fructose, galactose, manose, sucrose, and lactose. Combinations of suitable dissolution accelerators may also be used. Dissolution accelerators may be present in any suitable amount including, but not limited to, 1% to about 50% by weight of the multi-grade diverting particulate, or about 1% to about 10% by weight of the multi-grade diverting particulate, or about 10% to about 20% by weight of the multi-grade diverting particulate, or about 20% to about 30% by weight of the multi-grade diverting particulate, or about 30% to about 40% by weight of the multi-grade diverting particulate, or about 40% to about 50% by weight of the multi-grade diverting particulate.

Without limitation, placing the multi-grade diverting particulate into the subterranean formation may include placement into a wellbore or into the region of the subterranean formation surrounding the wellbore. In the subterranean formation, the multi-grade diverting particulate may form a barrier to fluid flow. Without limitation, this barrier to fluid flow may be used for controlling fluid, for example, in diversion to divert treatment fluids to another area, or in fluid loss control to reduce leak off into the subterranean formation. Advantageously, the multi-grade diverting particulate may be degradable so that they may be easily removed from the subterranean formation to facilitate production, for example, without the need for additional removal applications.

In addition to the multi-grade diverting particulate, the treatment fluid may include any number of additional additives, including, but not limited to, surfactants, acids, fluid loss control additives, gas, foamers, corrosion inhibitors, scale inhibitors, catalysts, clay control agents, biocides, friction reducing polymers, antifoam agents, bridging agents, dispersants, flocculants, $H_2S$ scavengers, $CO_2$ scavengers, oxygen scavengers, lubricants, gelling agents, breakers, weighting agents, particulate materials (e.g., proppant particulates) and any combination thereof. With the benefit of this disclosure, one of ordinary skill in the art should be able to recognize and select suitable additives for use in the treatment fluid.

In an embodiment, proppant particulates may be included in the treatment fluid. For example, where the treatment fluid is a fracturing fluid, the treatment fluid may transport proppant particulates into the subterranean formation. Examples of suitable proppant particulates may include, without limitation, sand, bauxite, ceramic materials, glass materials, polymer materials, polytetrafluoroethylene materials, nut shell pieces, cured resinous particulates including nut shell pieces, seed shell pieces, cured resinous particulates including seed shell pieces, fruit pit pieces, cured resinous particulates including fruit pit pieces, wood, composite particulates, and combinations thereof. Suitable composite particulates may include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Without limitation, the proppant particulates may include graded sand. Other suitable proppant particulates that may be suitable for use in subterranean applications may also be useful. Without limitation, the proppant particulates may have a particle size in a range from about 3.5 mesh (5.6 mm) to about 400 mesh (0.037 mm), U.S. Sieve Series. The proppant particulates may be carried by the treatment fluid. Without limitation, the proppant particulates may be present in the treatment fluid in a concentration of about 0.1 pounds per gallon (ppg) (12 $kg/m^3$) to about 10 ppg (1,198 $kg/m^3$), about 0.2 ppg (24 $kg/m^3$) to about 6 ppg (719 $kg/m^3$). These ranges encompass every number in between, for example. For example, the concentration may range between about 0.5 ppg (60 $kg/m^3$) to about 4 ppg (479 $kg/m^3$). One of ordinary skill in the art with the benefit of this disclosure should be able to select an appropriate amount of the proppant particulates to use for a particular application.

In an embodiment, the treatment fluid may be an acidic treatment fluid. The treatment fluid may be an aqueous acid treatment fluid, for example, when used in acidizing treatments. By way of example, the treatment fluid may include one or more acids, including, but not limited to, mineral acids, such as hydrochloric acid and hydrofluoric acid, organic acids, such as acetic acid, formic acid, and other organic acids, urea complexes, such as urea hydrochloride, chelating acids, such as ethylenediamine tetracetic acid, or mixtures thereof. In acidizing treatments, mixtures of hydrochloric acid and hydrofluoric may be used, in some instances.

In an embodiment, the treatment fluid may include a friction reducing polymer. The friction reducing polymer may be included in the treatment fluid to form a slickwater fluid, for example. The friction reducing polymer may be a synthetic polymer. Additionally, for example, the friction reducing polymer may be an anionic polymer or a cationic polymer. By way of example, suitable synthetic polymers may include any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. Without limitation, the friction reducing polymer may be included in the treatment fluid to provide a desired amount of friction reduction. For example, the friction reducing polymer may be included in the treatment fluid, for example, in an amount equal to or less than 0.2% by weight of an aqueous-based fluid present in the treatment fluid. Without limitation, the friction reducing polymer may be included in the treatment fluid in an amount sufficient to reduce friction without gel formation upon mixing. By way of example, the treatment fluid including the friction reducing polymer may not exhibit an apparent yield point.

In an embodiment, the treatment fluid may include a gelling agent. The gelling agent may be included in the treatment fluid to form an aqueous gel, foamed gel, or oil gel, for example. Suitable gelling agents may include any polymeric material capable of increasing the viscosity of a base fluid, such as an aqueous fluid. Without limitation, the gelling agent may include polymers that have at least two molecules that may be capable of forming a crosslink in a crosslinking reaction in the presence of a crosslinking agent, and/or polymers that have at least two molecules that are crosslinked (i.e., a crosslinked gelling agent). Other suitable gelled fluids may include linear gels that are not crosslinked. The gelling agents may be naturally-occurring, synthetic, or a combination thereof. Suitable gelling agents may include polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), and combinations thereof. The gelling agents include an organic carboxylated polymer, such as CMHPG. Additionally, polymers and copolymers that include one or more functional groups (e.g., hydroxyl, cis-hydroxyl, carboxylic acids, derivatives of carboxylic acids, sulfate, sulfonate, phosphate, phosphonate, amino, or amide groups) may be used. Where used, the gelling agent may be present in the treatment fluids in an amount sufficient to provide the desired viscosity. Without limitation, the gelling agents may be present in an amount in the range of from about 0.1% to about 10% by weight of the treatment fluid and, alternatively, from about 0.5% to about 4% by weight of the treatment fluid.

In an embodiment, a crosslinking agent may be included in the treatment fluids where it is desirable to crosslink the gelling agent. The crosslinking agent may include a metal ion that is capable of crosslinking at least two molecules of the gelling agent. Examples of suitable crosslinking agents include, but are not limited to, borate ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium triethanol amine, zirconium lactate triethanolamine, zirconium carbonate, zirconium acetylacetonate, zirconium maleate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, aluminum citrate, antimony compounds, chromium compounds, iron compounds, copper compounds, zinc compounds, and combinations thereof. Without limitation, the crosslinking agent may be formulated to remain inactive until it is "activated" by, among other things, certain conditions in the fluid (e.g., pH, temperature, etc.) and/or contact with some other substance. Without limitation, the crosslinking agent may be delayed by encapsulation with a coating (e.g., a porous coating through which the crosslinking gent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the pH of the treatment fluid, temperature, and/or the desired time for the crosslinking agent to crosslink the gelling agent molecules.

Where used, suitable crosslinking agents may be present in the treatment fluids in an amount sufficient to provide, inter alia, the desired degree of crosslinking between molecules of the gelling agent. Without limitation, the crosslinking agent may be present in the treatment fluids in an amount in the range of from about 0.0005% to about 0.2% by weight of the treatment fluid or alternatively from about 0.001% to about 0.05% by weight of the treatment fluid. One of ordinary skill in the art, with the benefit of this disclosure, should recognize the appropriate amount of crosslinking agent to include in a treatment fluid based on, among other things, the temperature conditions of a particular application, the type of gelling agents used, the molecular weight of the gelling agents, the desired degree of viscosification, and/or the pH of the treatment fluid.

In an embodiment, the treatment fluid may further include a gel breaker, which may be useful for reducing the viscosity of the viscosified fracturing fluid at a specified time. A gel breaker may include any compound capable of lowering the viscosity of a viscosified fluid. The term "break" (and its derivatives) as used herein refers to a reduction in the viscosity of the viscosified treatment fluid, e.g., by the breaking or reversing of the crosslinks between polymer molecules or some reduction of the size of the gelling agent polymers. No particular mechanism is implied by the term. Suitable gel breaking agents for specific applications and gelled fluids are known to one skilled in the arts. Nonlimiting examples of suitable breakers include oxidizers, peroxides, enzymes, acids, and the like. Some viscosified fluids also may break with sufficient exposure of time and temperature.

Example methods of using the multi-grade diverting particulate will now be described in more detail. As previously described, the multi-grade diverting particulate may be placed in the subterranean formation such that a barrier to fluid flow may be formed. Without limitations, the multi-grade diverting particulate may form packs, bridges, filter cakes, or other suitable barriers to thereby obstruct fluid flow. Without limitation, this barrier to fluid flow may be used, for example, in diversion to divert treatment fluids to another area and in fluid loss control to reduce leak off into the subterranean formation. The fluid flow preventing barrier may be formed in the subterranean formation to block certain flow paths in the subterranean formation, reducing the flow of fluids through the subterranean formation. Examples of the types of flow paths that may be blocked by the fluid flow preventing barrier include, but are not limited to, perforations, such as those formed by a perforation gun, fissures, cracks, fractures, micro fractures, streaks, flow channels, voids, vugs high permeable streaks, annular voids, or combinations thereof, as well as any other zone in the formation through which fluids may undesirably flow.

As will be appreciated by those of ordinary skill in the art, the multi-grade diverting particulate may be used in a variety of subterranean operations, where formation of a fluid flow diverting (or flow preventing) barrier may be desired, such as fluid diversion, and fluid loss control. Fluid diversion may be desired in a number of subterranean treatments, including fracturing and acidizing. Fluid loss control may be desired in a number of subterranean treatments, including, without limitation, drilling operations, fracturing operations, acidizing operations, work-over operations, and gravel packing operations. The multi-grade diverting particulate may be used prior to, during, or subsequent to a variety of subterranean operations. Methods of using the multi-grade diverting particulate may first include preparing a treatment fluid including the multi-grade diverting particulate. The treatment fluids may be prepared in any suitable manner, for example, by combining the multi-grade diverting particulate, base fluid, and any of the additional components described herein in any suitable order.

Methods may include introduction of the multi-grade diverting particulate into a subterranean formation. Introduction into the subterranean formation is intended to include introduction into a wellbore penetrating a subterranean formation, introduction into the zone(s) surrounding the wellbore, or both. A treatment fluid containing the multi-grade diverting particulate may dissipate into the subterranean formation through openings, which may be naturally occurring (e.g., pores, cracks, fractures, micro fractures fissures, etc.) or man-made. As the treatment fluid dissipates into the subterranean formation, the multi-grade diverting particulate may be screened out by the formation, whereby the multi-grade diverting particulate may be packed into the openings. In the subterranean formation, the multi-grade diverting particulate may form a flow preventing barrier that blocks certain flow paths therein, reducing the flow of fluids through the subterranean formation. Examples of the types of flow paths that may be blocked by the multi-grade diverting particulate include, but are not limited to, perforations, such as those formed by a perforation gun, fissures, cracks, fractures, micro fractures, streaks, flow channels, voids, high permeable streaks, annular voids, or combinations thereof, as well as any other zone in the formation through which fluids may undesirably flow. Methods may further include selecting one or more zones of the subterranean formation for control of fluid flow in which the multi-grade diverting particulate may be introduced. In an embodiment, additional treatment fluids may be introduced into the wellbore, wherein the treatment fluids may contain additional multi-grade diverting particulates or other diverting particulates. The multi-grade diverting particulates (or other diverting particulates) in each treatment fluid may be different sizes. In an embodiment, the first treatment fluid may include large multi-grade diverting particulates and each subsequent diverting particulate (or multi-grade diverting particulate) may decrease in size. In addition, additional solid diverting particulates (or multi-grade diverting particulates) may be included in each treatment fluid so that plugs may be formed with particles of different sizes.

The multi-grade diverting particulate may be used as fluid loss control agents, among others. Providing effective fluid loss control for subterranean treatment fluids may be highly desirable. "Fluid loss," as that term is used herein, refers to the undesirable migration or loss of fluids (such as the fluid portion of a drilling mud or cement slurry) into a subterranean formation and/or a proppant pack. Treatment fluids may be used in any number of subterranean operations, including drilling operations, cementing, fracturing operations, acidizing operations, gravel-packing operations, wellbore clean-out operations, pickling, and the like. Fluid loss may be problematic in any number of these operations. In fracturing treatments, for example, fluid loss into the formation may result in a reduction in fluid efficiency, such that the fracturing fluid cannot propagate the fracture as desired. Fluid loss control materials are additives that lower the volume of a filtrate that passes through a filter medium. That is, they block the pore throats and spaces that otherwise allow a treatment fluid to leak out of a desired zone and into an undesired zone. Particulate materials may be used as fluid loss control materials in subterranean treatment fluids to fill/bridge the pore spaces in a formation matrix and/or proppant pack and/or to contact the surface of a formation face and/or proppant pack, thereby forming a type of filter cake that blocks the pore spaces in the formation or proppant pack, and prevents fluid loss therein. Without limitation, when the multi-grade diverting particulate may be used as a fluid loss control agent, it may be used in conjunction with a fracturing or drilling operation. For example, the multi-grade diverting particulate may be included in a treatment fluid that is then placed into the portion of the subterranean formation at a pressure/rate sufficient to create or extend at least one fracture in that portion of the subterranean formation.

Multi-grade diverting particulates have similar actions but strive for a somewhat different approach. Multi-grade diverting particulates may be used to seal off a portion of the subterranean formation. By way of example, in order to divert a treatment fluid from permeable portions of the formation into the less permeable portions of the formation, a volume of treatment fluid may be pumped into the formation followed by multi-grade diverting particulate to seal off a portion of the formation where the first treatment fluid penetrated. When desired for diversion, the multi-grade diverting particulate may be added to the first treatment fluid or a slug of another treatment fluid may be prepared that contains the multi-grade diverting particulate. After the multi-grade diverting particulate is placed, a second treatment fluid may be placed wherein the second treatment fluid may be diverted to a new zone for treatment by the previously placed multi-grade diverting particulate. When being placed, the treatment fluid containing the multi-grade diverting particulate may flow most readily into the portion of the formation having the largest pores, fissures, or vugs, until that portion is bridged and sealed, thus diverting the remaining fluid to the next most permeable portion of the formation. These steps may be repeated until the desired number of stages of treating fluid has been pumped. In an embodiment, the multi-grade diverting particulate in the first treatment fluid may be smaller than the multi-grade diverting particulate in the second treatment fluid. In another instance, the multi-grade diverting particulate in the first treatment fluid may be larger than the multi-grade diverting particulate in the second treatment fluid, for example, by at least 5% or more. Without limitation, multi-grade diverting particulates may be included in treatment fluids introduced at matrix flow rates; that is, flow rates and pressures that are below the rate/pressure sufficient to create or extend fractures in that portion of a subterranean formation. Alternatively, the treatment fluids including multi-grade diverting particulate may be introduced above the fracturing pressure of the subterranean formation.

As previously described, the multi-grade diverting particulate may be used in fracturing treatments. A method of fracturing a wellbore may include placing a fracturing fluid into a portion of a wellbore. The fracturing fluid may be used to create or extend one or more fractures in the subterranean formation. The fracturing fluid may enter flow paths to create one or more primary fractures extending from the wellbore into the subterranean formation. Branches may extend from the primary fractures. A fracturing fluid, commonly referred to as a pre-pad or pad fluid, may be injected to initiate the fracturing of a subterranean formation prior to the injection of proppant particulates. The pre-pad or pad fluid may be proppant-free or substantially proppant-free. The proppant particulates may be suspended in a fracturing fluid which may be injected into the subterranean formation to create and/or extend at least one fracture. In order to create and/or extend a fracture, a fluid is typically injected into the subterranean formation at a rate sufficient to generate a pressure above the fracturing pressure.

In the fracturing treatment, it may be desired to plug previously formed flow paths in order to fracture additional portions of the subterranean formation. The multi-grade diverting particulate may be introduced into the subterranean formation to form a barrier that restricts entry of additional fracturing fluid within the previously formed flow paths. An example method may include introducing a fracturing fluid into a subterranean formation at or above a fracturing pressure of the subterranean formation. The method may further include introducing a multi-grade diverting particulate into the subterranean formation to thereby form a barrier that restricts fluid flow at a first location in the subterranean formation. The method may further include diverting the fracturing fluid to a second location in the subterranean formation. The multi-grade diverting particulate may be placed into the subterranean formation by forming a slug of a treatment fluid having a different composition than the fracturing fluid or by adding the multi-grade diverting particulate directly to the fracturing fluid, for example, creating a slug of the fracturing fluid including the multi-grade diverting particulate. The multi-grade diverting particulate may form a barrier at the first location to selectively place the fracturing fluid at one or more additional locations in the subterranean formation.

After a well treatment using the multi-grade diverting particulate, the wellbore and/or the subterranean formation may be prepared for production, for example, production of a hydrocarbon, therefrom. Preparing the wellbore and/or formation for production may include removing the multi-grade diverting particulate from one or more flow paths, for example, by allowing the multi-grade diverting particulate to degrade and subsequently recovering hydrocarbons from the formation via the wellbore. In an embodiment, the reservoir pressure may dislodge the multi-grade diverting particulate from one or more flow paths for flowback of the material to the surface. As previously described, the multi-grade diverting particulate may be degradable such that the barrier formed by the multi-grade diverting particulate may be removed. The degradable polymer may be degraded by materials purposely placed in the formation by injection, mixing the degradable particle with delayed reaction degradation agents, or other suitable means previously described to induce degradation.

Removal of the multi-grade diverting particulate particulates, if desired, may be affected by any number of suitable treatments. By way of example, the multi-grade diverting particulate may be removed by acid hydrolysis and/or by contact with oxidizers. Removal may include contacting the multi-grade diverting particulate with an oxidizer, such as persulfate, alkali metal chlorite or hypochlorite, peroxides, ammonium or metal chlorate, bromate, iodates or perchlorate, perbromate, or periodate. Without limitation, specific examples of suitable oxidizers may include sodium persulfate, ammonium persulfate, potassium persulfate, lithium hypochlorite, or sodium hypochlorite, calcium hypochlorite, sodium chlorate, sodium bromate, sodium iodate, sodium perchlorate, sodium perbromate, sodium periodate, potassium chlorate, potassium bromate, potassium iodate, potassium perchlorate, potassium perbromate, potassium periodate, ammonium chlorate, ammonium bromate, ammonium iodate, ammonium perchlorate, ammonium perbromate, ammonium periodate, magnesium chlorate, magnesium bromate, magnesium iodate, magnesium perchlorate, magnesium perbromate, magnesium periodate, zinc chlorate, zinc bromate, zinc iodate, zinc perchlorate, zinc perbromate, zinc periodate, sodium perborate, t-butyl hydroperoxide, or combinations thereof. The oxidizer may be introduced into the formation by way of the wellbore. Without limitation, the multi-grade diverting particulate particulates may be susceptible to hydrolysis by acids.

Accordingly, this disclosure describes systems, compositions, and methods that may use multi-grade diverting particulate particulates for diversion, fluid loss control, and/or other subterranean treatments for controlling fluid flow in subterranean formations. Without limitation, the systems, compositions, and methods may include any of the following statements:

Statement 1: A method comprising: introducing a treatment fluid into a wellbore penetrating a subterranean formation wherein the treatment fluid comprises: a base fluid; and multi-grade diverting particulates, wherein the multi-grade diverting particulates comprise a degradable polymer, wherein the degradable polymer comprises a first portion of the degradable polymer and a second portion of the degradable polymer of different grades, wherein the multi-grade diverting particulate at least partially plugs a zone in the subterranean formation; and diverting at least a portion of the treatment fluid and/or a subsequently introduced fluid away from the zone.

Statement 2: The method of statement 1, wherein the first portion of the degradable polymer comprises a first grade of a polyvinyl alcohol, and wherein the second portion of the degradable polymer comprises a second grade of polyvinyl alcohol.

Statement 3: The method of statement 1 or 2, wherein the first grade and the second grade vary by degree of hydrolysis, molecular weight, or both the degree of hydrolysis and the molecular weight.

Statement 4: The method of any one of statements 1 to 3, wherein the degradable polymer is selected from the group consisting of aliphatic poly(ester); poly(lactide); poly(glycolide); poly(ε-caprolactone); poly(hydroxyester ether); poly(hydroxybutyrate); poly(anhydride); polycarbonate; polyol; poly(orthoester); poly(aminoacid); poly(ethyleneoxide); poly(phosphazene); poly(etherester), hydroxy propyl methylcellulose, pectin, polyethylene oxide, polyvinyl alcohol, plasticized polyvinyl alcohol, alginate, polycaprolactone, gelatinised starch-based material, polyester amide, polyamide, and any combination thereof.

Statement 5: The method of any one of statements 1 to 4, wherein the first portion of the degradable polymer and the second portion of the degradable polymer have different degrees of hydrolysis and different molecular weights.

Statement 6: The method of any one of statements 1 to 5, wherein the multi-grade diverting agent comprises a first region comprising the first portion of the degradable polymer and a second region comprising the second portion of the degradable polymer.

Statement 7: The method of any one of statements 1 to 6, wherein the first portion of the degradable polymer is coated with the second portion of the degradable polymer, wherein the second portion of the degradable polymer has a higher degree of hydrolysis and/or higher molecular weight than the first portion of the degradable polymer.

Statement 8: The method of any one of statements 1 to 7, wherein the multi-grade diverting particulate comprises a homogenous compound that comprises the first portion of the degradable polymer and the second portion of the degradable polymer, wherein the second portion of the degradable polymer has a higher degree of hydrolysis and/or higher molecular weight than the first portion of the degradable polymer.

Statement 9: The method of any one of statements 1 to 8, wherein the multi-grade diverting particulate comprises a continuous phase of the degradable polymer and an internal phase of the degradable polymer.

Statement 10: The method of any one of statements 1 to 9, wherein the continuous phase of the degradable polymer includes the first portion of the degradable polymer and the internal phase of the degradable polymer comprises the second portion of the degradable polymer.

Statement 11: The method of any one of statements 1 to 10, further comprising introducing an additional diverting agent into the zone, wherein the additional diverting agent forms a plug with the multi-grade diverting particulates.

Statement 12: The method of any one of statements 1 to 11, wherein the additional diverting agent comprises at least one degradable polymer selected from the group consisting of aliphatic poly(ester); poly(lactide); poly(glycolide); poly(ε-caprolactone); poly(hydroxyester ether); poly(hydroxybutyrate); poly(anhydride); polycarbonate; polyol; poly(orthoester); poly(aminoacid); poly(ethyleneoxide); poly(phosphazene); poly(etherester), hydroxy propyl methylcellulose, pectin, polyethylene oxide, polyvinyl alcohol, plasticized polyvinyl alcohol, alginate, polycaprolactone, gelatinised starch-based material, polyester amide, polyamide, and any combination thereof.

Statement 13: The method of any one of statements 1 to 12, further comprising allowing the multi-grade diverting particulates to dissolve or degrade.

Statement 14: The method of any one of statements 1 to 13, wherein the treatment fluid is injected into the wellbore at or above a fracture gradient of the subterranean formation.

Statement 15: The method of any one of statements 1 to 14, wherein prior to the step of introducing, the method further comprising mixing the treatment fluid in a mixer, wherein the introducing comprising pumping the treatment fluid into the wellbore with a pump.

Statement 16: The method of any one of statements 1 to 15, multi-grade diverting particulates have a $D_v50$ particle size ranging from about 400 microns to about 10 millimeters, wherein the first portion of the degradable polymer and the second portion of the degradable polymer comprise different grades of polyvinyl alcohol, wherein the different grades of the polyvinyl alcohol differ by degree of hydrolysis and molecular weight, wherein the first portion of the degradable polymer has a degree of hydrolysis ranging from about 84 to about 89.5, and wherein the second portion of the degradable polymer has a degree of hydrolysis that varies by more than 1% from the first portion of the degradable polymer.

Statement 17: A treatment fluid comprising: a base fluid; and a multi-grade diverting particulate, wherein the multi-grade diverting particulates comprise a degradable polymer, wherein the degradable polymer comprises a first portion of the degradable polymer and a second portion of the degradable polymer of different grades.

Statement 18: The treatment fluid of statement 17, wherein the degradable polymer is selected from the group consisting of aliphatic poly(ester); poly(lactide); poly(glycolide); poly(ε-caprolactone); poly(hydroxyester ether); poly(hydroxybutyrate); poly(anhydride); polycarbonate; polyol; poly(orthoester); poly(aminoacid); poly(ethyleneoxide); poly(phosphazene); poly(etherester), hydroxy propyl methylcellulose, pectin, polyethylene oxide, polyvinyl alcohol, plasticized polyvinyl alcohol, alginate, polycaprolactone, gelatinised starch-based material, polyester amide, polyamide, and any combination thereof.

Statement 19: The treatment fluid of statement 17 or 18, wherein the first portion of the degradable polymer is coated with the second portion of degradable polymer, wherein the first portion of the degradable polymer has a lower degree of hydrolysis and/or lower molecular weight than the second portion of the degradable polymer.

Statement 20: The treatment fluid of any one of statements 17 to 19, wherein the multi-grade diverting particulate comprises a continuous phase of the degradable polymer and an internal phase of the degradable polymer, wherein the continuous phase of the degradable polymer comprises the first portion of the degradable polymer, wherein the internal phase of the degradable polymer comprises the second portion of the degradable polymer, wherein the first portion of the degradable polymer and the second portion of the degradable polymer have different degrees of hydrolysis.

Figure 4:
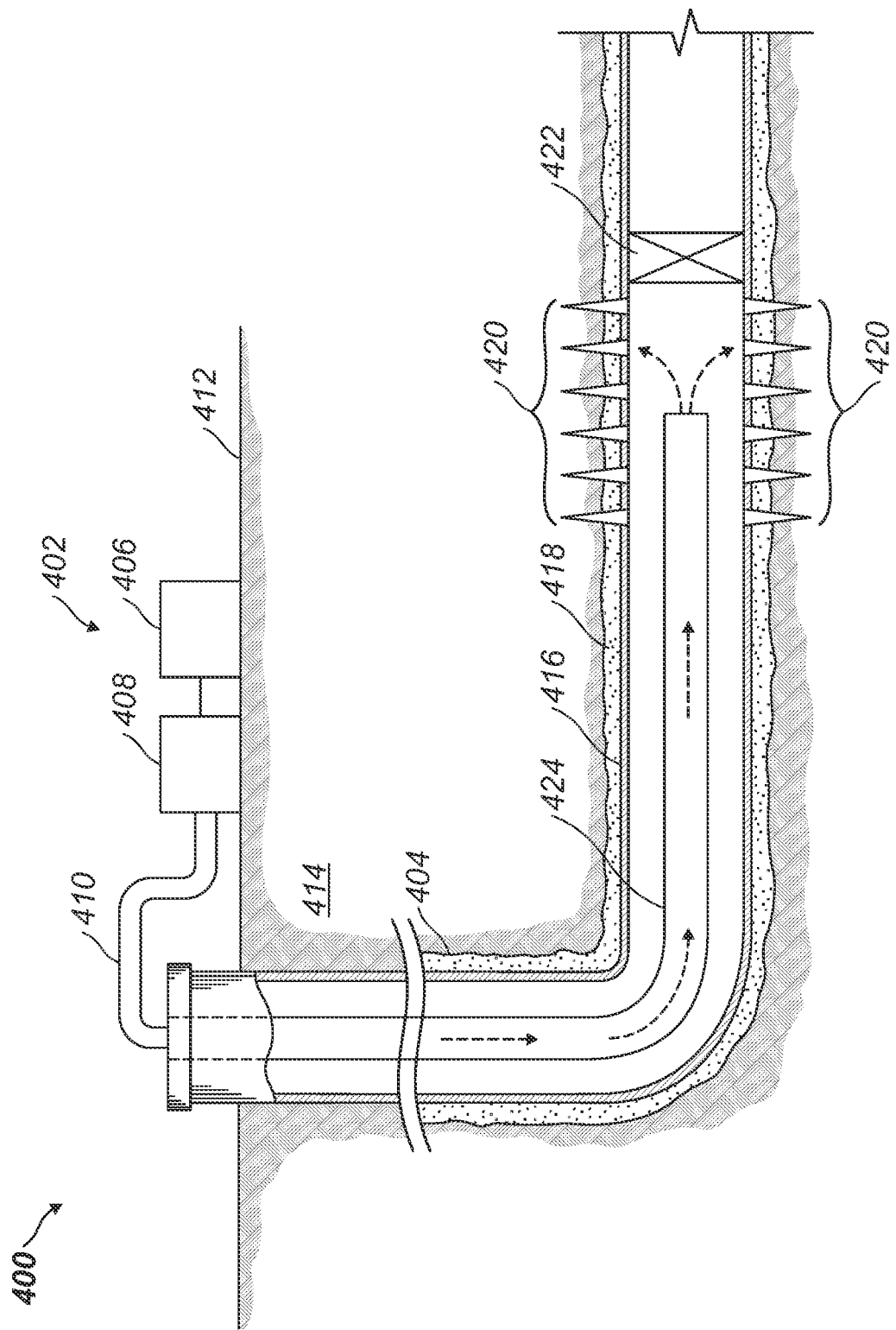
FIG. 4 is a schematic illustration of example well system showing placement of a treatment fluid into a wellbore.

Example methods of using the multi-grade diverting particulate particulates will now be described in more detail with reference to FIG. 4. Any of the previous examples of the multi-grade diverting particulate particulates may apply in the context of FIG. 4. FIG. 4 illustrates an example well system 400 that may be used for preparation and delivery of a treatment fluid downhole. It should be noted that while FIG. 4 generally depicts a land-based operation, those skilled in the art will readily recognize that the principles described herein are equally applicable to subsea operations that employ floating or sea-based platforms and rigs, without departing from the scope of the disclosure.

Referring now to FIG. 4, a fluid handling system 402 is illustrated. The fluid handling system 402 may be used for preparation of a treatment fluid including the multi-grade diverting particulate and for introduction of the treatment fluid into a wellbore 404. The fluid handling system 402 may include mobile vehicles, immobile installations, skids, hoses, tubes, fluid tanks or reservoirs, pumps, valves, and/or other suitable structures and equipment. As illustrated, the fluid handling system 402 may include a fluid supply vessel 406, pumping equipment 408, and wellbore supply conduit 410. While not illustrated, the fluid supply vessel 406 may contain one or more components of the treatment fluid (e.g., multi-grade diverting particulate particulates, base fluid, etc.) in separate tanks or other containers that may be mixed at any desired time. Pumping equipment 408 may be fluidically coupled with the fluid supply vessel 406 and wellbore supply conduit 410 to communicate the treatment fluid into wellbore 404. Fluid handling system 402 may also include surface and downhole sensors (not shown) to measure pressure, rate, temperature and/or other parameters of treatment. Fluid handling system 402 may also include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection of the treatment fluid. As depicted in FIG. 4, the fluid supply vessel 406 and pumping equipment 408 may be above the surface 412 while the wellbore 404 is below the surface 412. As will be appreciated by those of ordinary skill in the art, well system 400 may be configured as shown in FIG. 4 or in a different manner, and may include additional or different features as appropriate. By way of example, fluid handling system 402 may be deployed via skid equipment, marine vessel, or may be included of sub-sea deployed equipment.

Without continued reference to FIG. 4, well system 400 may be used for introduction of a treatment fluid into wellbore 404. The treatment fluid may contain a base fluid (which may be oil- or aqueous-based) and multi-grade diverting particulate, described herein. Generally, wellbore 404 may include horizontal, vertical, slanted, curved, and other types of wellbore geometries and orientations. Without limitation, the treatment fluid may be applied through the wellbore 404 to subterranean formation 414 surrounding any portion of wellbore 404. As illustrated, the wellbore 404 may include a casing 416 that may be cemented (or otherwise secured) to wellbore wall by cement sheath 418. Perforations 420 allow the treatment fluid and/or other materials to flow into and out of the subterranean formation 414. A plug 422, which may be any type of plug (e.g., bridge plug, etc.) may be disposed in wellbore 404 below the perforations 420 if desired. While FIG. 4 illustrates use of treatment fluid in a cased section of wellbore 404, it should be understood that treatment fluid may also be used in portions of wellbore 404 that are not cased.

The treatment fluid including the multi-grade diverting particulate may be pumped from fluid handling system 402 down the interior of casing 416 in wellbore 404. As illustrated, well conduit 424 (e.g., coiled tubing, drill pipe, etc.) may be disposed in casing 416 through which the treatment fluid may be pumped. The well conduit 424 may be the same or different than the wellbore supply conduit 410. For example, the well conduit 424 may be an extension of the wellbore supply conduit 410 into the wellbore 404 or may be tubing or other conduit that is coupled to the wellbore supply conduit 410. The treatment fluid may be allowed to flow down the interior of well conduit 424, exit the well conduit 424, and finally enter subterranean formation 414 surrounding wellbore 404 by way of perforations 420 through the casing 416 (if the wellbore is cased as in FIG. 4) and cement sheath 418. Without limitation, the treatment fluid may be introduced into subterranean formation 414 whereby one or more fractures (not shown) may be created or enhanced in subterranean formation 414. For example, the treatment fluid may be introduced into subterranean formation 414 at or above a fracturing pressure. As previously described, the treatment fluid including the multi-grade diverting particulate particulates may be placed into the subterranean formation 414 after a previous treatment has been performed such that additional locations in the subterranean formation 414 may be treated. Without limitation, at least a portion of the multi-grade diverting particulate may be deposited in the subterranean formation 414. As previously described, the multi-grade diverting particulate may form a barrier to fluid flow in the subterranean formation.

As previously described, a variety of treatments may be performed using the multi-grade diverting particulate. Suitable subterranean treatments may include, but are not limited to, drilling operations, production stimulation operations (e.g., fracturing, acidizing), and well completion operations (e.g., gravel packing or cementing). These treatments may generally be applied to the subterranean formation. The barrier to fluid flow formed in the subterranean formation 414 by the multi-grade diverting particulate may be used in these treatments for diversion and fluid loss control, among others. For example, the diversion of the treatment fluids may help ensure that the treatment fluids are more uniformly distributed in the subterranean formation.

Figure 5A:
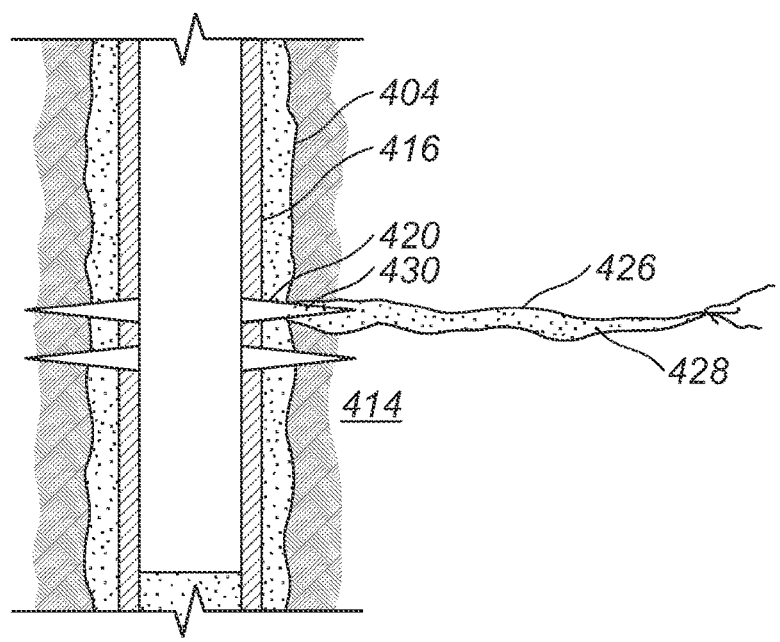
FIGS. 5A and 5B are schematic illustrations showing use of multi-grade diverting particulates in an example fracturing treatment.

The well treatment may include a fracturing treatment in which one or more fractures may be created in subterranean formation 414. Referring now to FIG. 5A, fracture 426 is shown extending from wellbore 404. The fracturing of the subterranean formation 414 may be accomplished using any suitable technique. By way of example, a fracturing treatment may include introducing a fracturing fluid into subterranean formation 414 at or above a fracturing pressure. The fracturing fluid may be introduced by pumping the fracturing fluid through casing 416, perforations 420, and into subterranean formation 414 surrounding wellbore 404. Alternatively, a jetting tool (not shown) may be used to initiate the fracture 426. The fracturing fluid may include proppant particulates which may be deposited on the fracture 426 to form a proppant pack 428.

Figure 5B:
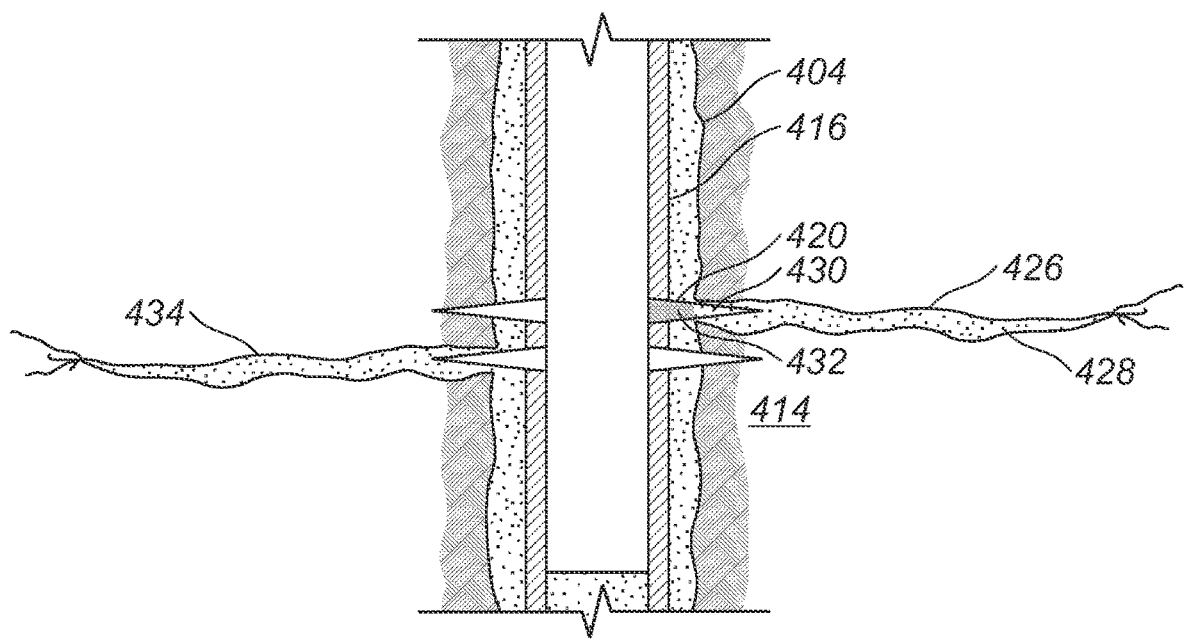

To form a barrier that can divert the fracturing fluid to additional flow paths, the multi-grade diverting particulate may be introduced into the subterranean formation 414. The multi-grade diverting particulate may be carried into the subterranean formation 414 in a treatment fluid. The multi-grade diverting particulate may be introduced through the perforation 420 and into a perforation tunnel 430. Without limitation, the treatment fluid including the multi-grade diverting particulate may be a slug of the fracturing fluid including the multi-grade diverting particulate or a separate treatment fluid including the multi-grade diverting particulate. The treatment fluid including the multi-grade diverting particulate may be introduced above the fracturing pressure or at matrix flow rates. Without limitation, the proppant pack 428 may act as a filter screening the multi-grade diverting particulate out of the treatment fluid. As a result, a layer or pack of the multi-grade diverting particulate may form on the proppant particulates, in the perforation tunnel 430, or both. As shown in FIG. 5B, a barrier 432 including the multi-grade diverting particulate may be formed in the perforation tunnel 430. The resulting barrier 432 may be able to divert fluids away from fracture 426. Such diversion may result in a back pressure build up that may be detected at surface 412 (e.g., shown on FIG. 4). After formation of the barrier 432, additional subterranean treatments may be performed. As shown on FIG. 5B, additional fracture 434 may be created in subterranean formation 414. Additional fracture 434 may be formed, for example, in a portion of subterranean formation 414 with least resistance to fluid flow, as barrier 432 has diverted the fracturing fluid into additional portions of the subterranean formation 414 in which treatment may be desired.

The exemplary multi-grade diverting particulate particulates disclosed herein may directly or indirectly affect one or more components or pieces of equipment associated with the preparation, delivery, recapture, recycling, reuse, and/or disposal of the multi-grade diverting particulate particulates. For example, the multi-grade diverting particulate particulates may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the sealant composition. The multi-grade diverting particulate particulates may also directly or indirectly affect any transport or delivery equipment used to convey the multi-grade diverting particulate particulates to a well site or downhole such as, for example, any transport vessels, conduits, pipelines, trucks, tubulars, and/or pipes used to compositionally move the multi-grade diverting particulate particulates from one location to another, any pumps, compressors, or motors (e.g., topside or downhole) used to drive the multi-grade diverting particulate particulates into motion, any valves or related joints used to regulate the pressure or flow rate of the multi-grade diverting particulate particulates (or fluids containing the same multi-grade diverting particulate particulates), and any sensors (i.e., pressure and temperature), gauges, and/or combinations thereof, and the like. The disclosed multi-grade diverting particulate particulates may also directly or indirectly affect the various downhole equipment and tools that may come into contact with the multi-grade diverting particulate particulates such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of certain aspects of some of the systems and methods are given. In no way should the following examples be read to limit, or define, the entire scope of the disclosure.

Example 1

Figure 6:
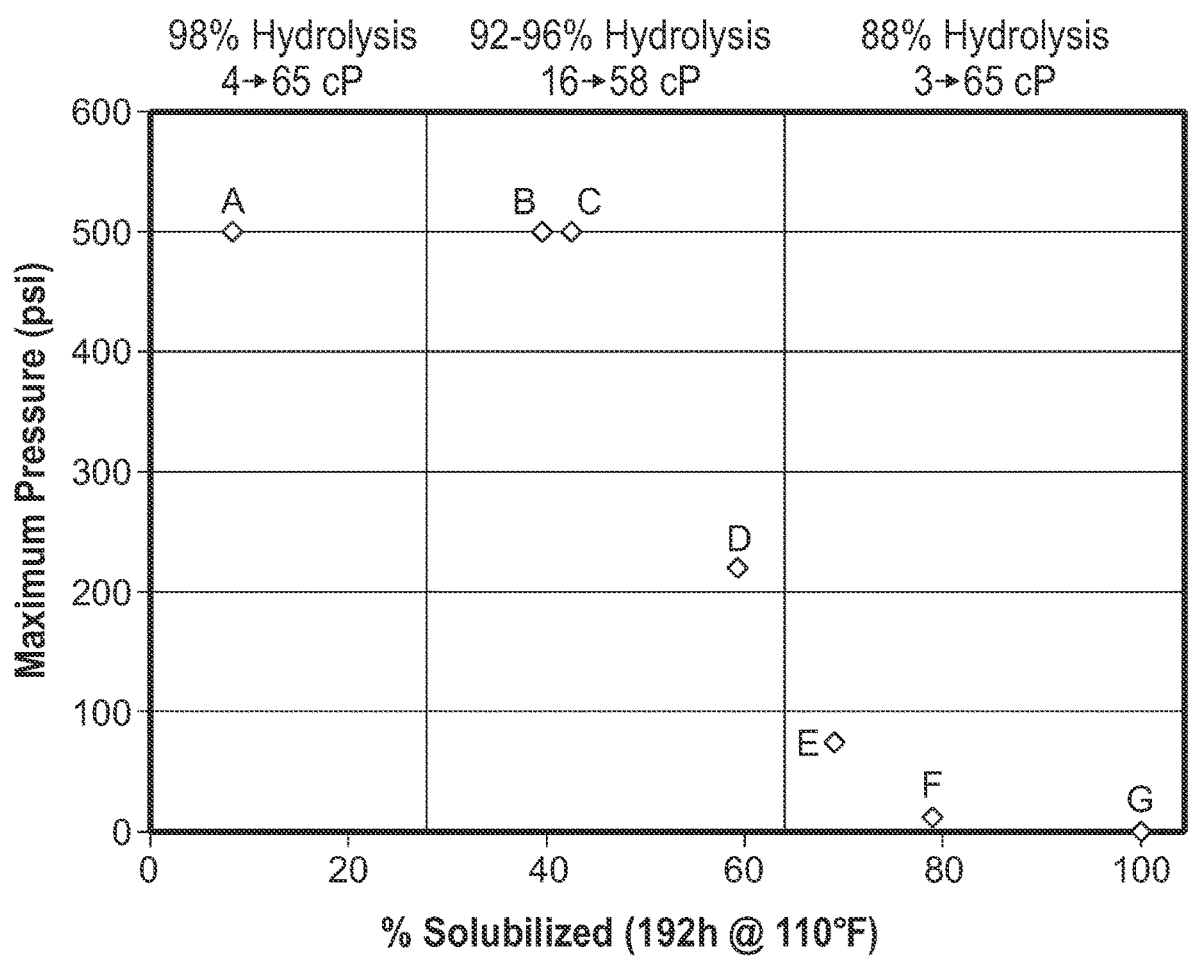
FIG. 6 illustrates the effect of different grades of PVA on the bridge stability, solubilization rate, and fluid loss performance.

Tests were run to determine the effect of different grades of PVA on the bridge stability, solubilization rate, and fluid loss performance. Each PVA grade was defined by its grade (i.e. degree of hydrolysis and molecular weight/viscosity) and was tested in water at a temperature of about 43° C. for about 192 hours. Each PVA grade was tested to determine its bridge/seal stability (i.e. the maximum pressure the bridge/seal could withstand) using a bench-top unit with a 500 μm slot at 43° C. The results are provided in Table 1 and depicted in FIG. 6.

TABLE 1

| PVA | Degree of Hydrolysis (%) | Weight Average Molecular Weight | Viscosity (cP) | % Solubilized | Max Pressure (psi) |
|---|---|---|---|---|---|
| A | 98.0-98.8 | 85,000-124,000 | 28.0-32.0 | 8 | 500 |
| B | 95.5-96.5 | 85,000-124,000 | 27.0-31.0 | 39 | 500 |
| C | 92.0-94.0 | 146,000-186,000 | 53.0-63.0 | 41 | 500 |
| D | 91.0-93.0 | 50,000-85,000 | 14.5-19.5 | 59 | 210 |
| E | 87.0-89.0 | 146,000-186,000 | 45.0-55.0 | 69 | 85 |
| F | 87.0-89.0 | 50,000-85,000 | 17.5-20.5 | 79 | 15 |
| G | 87.0-89.0 | 13,000-23,000 | 3.0-3.7 | 400 | 0 |

*Viscosity of 4% aqueous solution

The results show that a PVA with a higher grade (more hydrolysis and higher molecular weight/viscosity) has good fluid loss performance but low solubility. A PVA with a lower grade (less hydrolysis and lower viscosity) has poor fluid loss performance but high solubility.

It should be understood that the compositions and methods are described in terms of "including," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A treatment fluid comprising:
   a base fluid; and
   a multi-grade diverting particulate, wherein the multi-grade diverting particulates comprise a degradable polymer, wherein the degradable polymer comprises a first portion of the degradable polymer and a second portion of the degradable polymer, wherein the first portion of the degradable polymer comprises a first grade of the degradable polymer, of the degradable polymer comprises a second grade of the degradable polymer of different grades, and wherein the first grade of the degradable polymer and the second grade of the degradable polymer vary in molecular weight by at least 5,000.

2. The treatment fluid of claim 1, wherein the base fluid is an aqueous fluid.

3. The treatment fluid of claim 1, wherein the degradable polymer is selected from the group consisting of aliphatic poly(ester); poly(lactide); poly(glycolide); poly(ε-caprolactone); poly(hydroxyester ether); poly(hydroxybutyrate); poly(anhydride); polycarbonate; polyol; poly(orthoester); poly(aminoacid); poly(ethyleneoxide); poly(phosphazene); poly(etherester), hydroxy propyl methylcellulose, pectin, polyethylene oxide, polyvinyl alcohol, plasticized polyvinyl alcohol, alginate, polycaprolactone, gelatinised starch-based material, polyester amide, polyamide, and any combination thereof.

4. The treatment fluid of claim 1, wherein the degradable polymer is polyvinyl alcohol.

5. The treatment fluid of claim 1, wherein the first portion of the degradable polymer is coated with the second portion of degradable polymer, wherein the first portion of the degradable polymer has a lower degree of hydrolysis.

6. The treatment fluid of claim 1, wherein the first portion of the degradable polymer is coated with the second portion of the degradable polymer, wherein the first portion of the degradable polymer has a lower molecular weight than the second portion of the degradable polymer.

7. The treatment fluid of claim 1, wherein the multi-grade diverting particulate comprises a continuous phase of the degradable polymer and an internal phase of the degradable polymer, wherein the continuous phase of the degradable polymer comprises the first portion of the degradable polymer, wherein the internal phase of the degradable polymer comprises the second portion of the degradable polymer, wherein the first portion of the degradable polymer and the second portion of the degradable polymer have different degrees of hydrolysis.

8. The treatment fluid of claim 1, further comprising an additional diverting agent.

9. The treatment fluid of claim 8, wherein the additional diverting agent is a degradable polymer selected from the group consisting of aliphatic poly(ester); poly(lactide); poly(glycolide); poly(ε-caprolactone); poly(hydroxyester ether); poly(hydroxybutyrate); poly(anhydride); polycarbonate; polyol; poly(orthoester); poly(aminoacid); poly(ethyleneoxide); poly(phosphazene); poly(etherester), hydroxy propyl methylcellulose, pectin, polyethylene oxide, polyvinyl alcohol, plasticized polyvinyl alcohol, alginate, polycaprolactone, gelatinised starch-based material, polyester amide, polyamide, and any combination thereof.

10. The treatment fluid of claim 1, wherein the multi-grade diverting particulates have a Dv50 particle size ranging from about 0.01 microns to about 10 millimeters.

11. The treatment fluid of claim 1, wherein multi-grade diverting particulates have a Dv50 particle size ranging from about 400 microns to about 10 millimeters.

12. The treatment fluid of claim 1, wherein the multi-grade diverting particulates are present in the treatment fluid in an amount ranging from about 0.05% to about 75%.

13. The treatment fluid of claim 1, wherein the degradable polymer is present in the multi-grade diverting particulates in an amount ranging from about 60 wt % to about 100 wt %.

14. The treatment fluid of claim 1, wherein the multi-grade diverting particulates further comprises a plasticizer selected from the group consisting of glycol, polyethylene glycol, polypropylene glycol, fatty acid esters, lactide monomers, glycolide monomers, citric acid esters, epoxidized oil, adipate ester, azaleate, and any combination thereof.

15. A treatment fluid comprising:
    an aqueous base fluid; and
    a multi-grade diverting particulate, wherein the multi-grade diverting particulate comprises polyvinyl alcohol, wherein the polyvinyl alcohol comprises a first portion of the polyvinyl alcohol and a second portion of the polyvinyl alcohol, wherein the first portion of the degradable polymer comprises a first grade of the degradable polymer and the second portion of the degradable polymer comprises a second grade of the degradable polymer, wherein the first grade of the polyvinyl alcohol and the second grade of the polyvinyl alcohol vary in molecular weight by at least 5,000.

16. The treatment fluid of claim 15, wherein the first portion of the polyvinyl alcohol is coated with the second portion of polyvinyl alcohol, wherein the first portion of the polyvinyl alcohol has a lower degree of hydrolysis.

17. The treatment fluid of claim 15, wherein the first portion of the polyvinyl alcohol is coated with the second portion of the polyvinyl alcohol, wherein the first portion of the polyvinyl alcohol has a lower molecular weight than the second portion of the polyvinyl alcohol.

18. The treatment fluid of claim 15, wherein the multi-grade diverting particulate comprises a continuous phase of the polyvinyl alcohol and an internal phase of the polyvinyl alcohol, wherein the continuous phase of the polyvinyl alcohol comprises the first portion of the polyvinyl alcohol, wherein the internal phase of the polyvinyl alcohol comprises the second portion of the polyvinyl alcohol, wherein the first portion of the polyvinyl alcohol and the second portion of the polyvinyl alcohol have different degrees of hydrolysis.

19. The treatment fluid of claim 15, wherein multi-grade diverting particulates have a Dv50 particle size ranging from about 400 microns to about 10 millimeters.

20. The treatment fluid of claim 15, wherein the multi-grade diverting particulates further comprises a plasticizer selected from the group consisting of glycol, polyethylene glycol, polypropylene glycol, fatty acid esters, lactide monomers, glycolide monomers, citric acid esters, epoxidized oil, adipate ester, azaleate, and any combination thereof.

* * * * *